United States Patent [19]

Brinker

[11] Patent Number: 5,006,145
[45] Date of Patent: Apr. 9, 1991

[54] CENTER BIASED STIRRING FOR IMPROVED GLASS HOMOGENIZATION

[75] Inventor: Sheldon R. Brinker, Natrona Heights, Pa.

[73] Assignee: PPG Industries, Inc., Pittsburgh, Pa.

[21] Appl. No.: 484,311

[22] Filed: Feb. 26, 1990

[51] Int. Cl.$^5$ ............................................. C03B 5/187
[52] U.S. Cl. ........................................ 65/134; 65/178
[58] Field of Search ................. 65/134, 135, 178–180

[56] References Cited

U.S. PATENT DOCUMENTS

| | | |
|---|---|---|
| 1,988,783 | 1/1935 | Canfield . |
| 2,877,280 | 3/1959 | Eden . |
| 3,053,517 | 9/1962 | Penberthy . |
| 3,236,618 | 2/1966 | Allman ................................ 65/178 |
| 3,989,497 | 11/1976 | Dickinson et al. .................... 65/135 |
| 3,997,315 | 12/1976 | Rhodes et al. ........................ 65/135 |
| 4,047,918 | 9/1977 | Heithoff ............................... 65/179 |
| 4,055,408 | 10/1977 | Novak et al. ......................... 65/135 |
| 4,339,261 | 7/1982 | Walton et al. ........................ 65/178 |
| 4,493,557 | 1/1985 | Nayak et al. ...................... 65/178 X |
| 4,517,000 | 5/1985 | Burget et al. ......................... 65/178 |
| 4,744,809 | 5/1988 | Pecoraro ............................... 65/135 |

FOREIGN PATENT DOCUMENTS 54-5812  3/1979  Japan ..................................... 65/178

*Primary Examiner*—Robert L. Lindsay
*Attorney, Agent, or Firm*—Dennis G. Millman

[57] ABSTRACT

Better homogenization of molten glass or the like is achieved by a row of stirrers when greater stirring force is provided in the center portion of the row. Preferred embodiments employ stirrers with blades, and stirrers in the center portion have longer blades than in outboard portions of the row.

11 Claims, 2 Drawing Sheets

CENTER BIASED STIRRING FOR IMPROVED GLASS HOMOGENIZATION

BACKGROUND OF THE INVENTION

This invention relates to homogenizing viscous liquid material, particularly molten glass, by means of a plurality of stirrers. More specifically, the stirring arrangement of the present invention provides more effective homogenization than prior art arrangements.

Homogenization is important in the manufacture of glass because regions of very slight compositional differences can exhibit different indices of refraction from the bulk of the glass, with the result that the differential bending of light rays is visible as distortion of an image viewed through the glass product. Minimizing this effect is desirable for producing glass of high optical quality. The inhomogeneities may be present in the molten glass due to delayed melting of some raw materials or due to erosion of refractory walls with which it is in contact during the melting process. Some glasses develop inhomogeneity by vaporization of volatile constituents from surface portions of the molten mass in the melting furnace. Homogenization of molten glass is also important in those glassmaking processes in which colorants or other substances are added to the glass after melting has been substantially completed.

Various rotated stirrers including spiral types and paddle types have been used to mix and thereby improve the homogeneity of molten glass. A typical arrangement in larger scale, continuous glass producing operations includes one or more rows of stirrers extending across the path of molten glass travel along a channel or through a restricted waist structure. Examples of that type may be seen in U.S. Pat. Nos. 4,047,918 (Heithoff), 4,339,261 (Walton et al.), and 4,744,809 (Pecoraro et al.). Many particular stirrer structures have been used in the prior art and have potential applicability to the present invention. An example of a stirrer structure that has a particularly powerful stirring action is shown in U.S. Pat. No. 4,493,557 (Nayak et al.).

Most stirring arrangements have as their object to divert portions of the molten glass vertically and/or laterally from the overall flow path, thereby intermixing portions of the glass stream. However, it has been found that when a relatively wide row of stirrers is involved (i.e., four or more stirrers in the row), even stirrers having very powerful stirring action tend to have a localized effect such that distinct bands of glass downstream from the stirring zone are produced within which the glass is relatively well mixed but between which insufficient mixing has occurred. Increasing the stirring action seems to have little effect on the existence of these bands. The presence of these bands indicates the possibility that significant inhomogeneity remains in the molten glass which may deteriorate the optical quality of the product glass. It would be desirable to reduce this banding effect so as to assure better homogeneity of the glass.

SUMMARY OF THE INVENTION

It has now been discovered that the banding effect downstream from a row of stirrers can be alleviated by increasing the stirring force in the center portion of the row relative to the remainder of the row, thereby yielding improved homogenization. Although the precise mechanism by which the invention achieves the desired result is not fully understood, it appears that a non-uniform power distribution along the row of stirrers has a destabilizing effect on the band formation by encouraging lateral exchange of material by drawing more material through the central region. Other non-uniform, asymmetrical, or unbalanced arrangements have not been found to have the same desirable effect. Accordingly, enhancing the stirring force at the center of the row produces a unique and surprising improvement.

Providing greater stirring force in the center can be accomplished by various means such as increasing speed of rotation or employing a different stirrer structure. In the embodiment of stirrers preferred here, blades of adjacent stirrers intermesh, thereby precluding using different speeds of rotation along the row. In that embodiment, a convenient way of providing increased stirring power has been found to be the use of longer stirrer blades on the center stirrers.

The present invention has applicability to stirring arrangements having a plurality of stirrers in a row, that is, in a generally elongated group that extends across the direction of overall flow (not necessarily in a precisely straight line). Generally, the principles of the present invention will have effect when the row includes at least four stirrers. The center of the row may be defined as the central region occupied by no more than half of the stirrers. The remainder of the stirrers may be termed the outboard stirrers. The enhanced stirring force is provided to stirrers within the central region, but not necessarily to all of the stirrers in the central region. It may be said that the average stirring force within the central region is substantially greater than the average stirring force of the outboard stirrers.

THE DRAWINGS

DETAILED DESCRIPTION

The present invention has found particular utility in connection with homogenizing molten glass, and the description of the invention is made with reference to that application, but it should be understood that the principles and advantages of the invention are not limited to any particular composition and may be considered applicable to homogenizing a viscous melt of any similar material.

Figure 1:
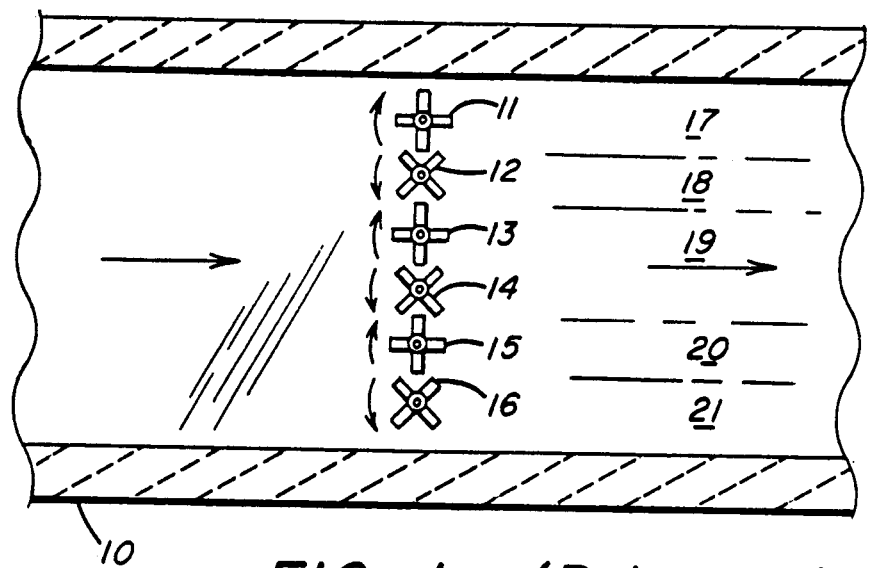
FIG. 1 is a schematic top view of a typical prior art arrangement of a row of stirrers in a channel conveying molten glass, showing the undesirable banding effect.

FIG. 1 depicts in top view a channel 10 that may be made of refractory ceramic material adapted to convey a stream of molten glass from left to right as viewed in the figure which may be termed the "longitudinal" direction. The channel 10 may be a forehearth or a waist section of a glass melting furnace. A channel arrangement particularly useful for homogenizing flat glass immediately prior to forming is disclosed in U.S. Pat. No. 4,744,809 (Pecoraro et al.), the disclosure of which is hereby incorporated by reference. A row of stirrers 11 through 16 is shown in FIG. 1, with the row extending substantially transversely across the longitudinal path of the glass through the channel. As an example, the row includes six stirrers, which is typical of the number of stirrers to which the invention is applicable, but the row could have as few as four stirrers. There is no upper limit as to the number of stirrers that may be used in a row other than economic considerations, and some installations may include as many as 10 to 12 or more stirrers in a row, depending upon the width of the channel. A single row of stirrers is shown in FIG. 1, which is sufficient for the purposes of the present invention, but a plurality of rows is preferred. As a specific example, two rows of stirrers are preferred. If more than one row is used, only one of the rows need include the enhanced center stirring power feature of the present invention, preferably the downstream row, but optimized results may be attained if all of the rows include that feature. It should be understood that the use of the word "row" herein is not intended to require that the group of stirrers being referred to are in a straight line. The stirrers could be of any known type such as the common helical type, but the depicted preferred embodiment for stirring molten glass generally comprises a plurality of blades in a substantially horizontal plane, with the blades of adjacent stirrers intermeshing with one another while rotating counter to each other in the manner of gear teeth. A particular stirrer structure example will be described in greater detail in connection with FIG. 3.

Physical modelling of an arrangement as shown in FIG. 1 in which dye was injected into a fluid simulating molten glass revealed that streaks of dye remained between each of the zones 17 through 21 downstream from the stirrers. The zones were approximately in alignment with each of the outboard stirrers, and a central zone 19 appeared downstream from the central stirrers 13 and 14. Changing rotational speed of the stirrers had little effect on the formation of the bands. Using stirrers of reduced diameter at the end positions 11 and 16 produced the same banding effect.

Figure 2:
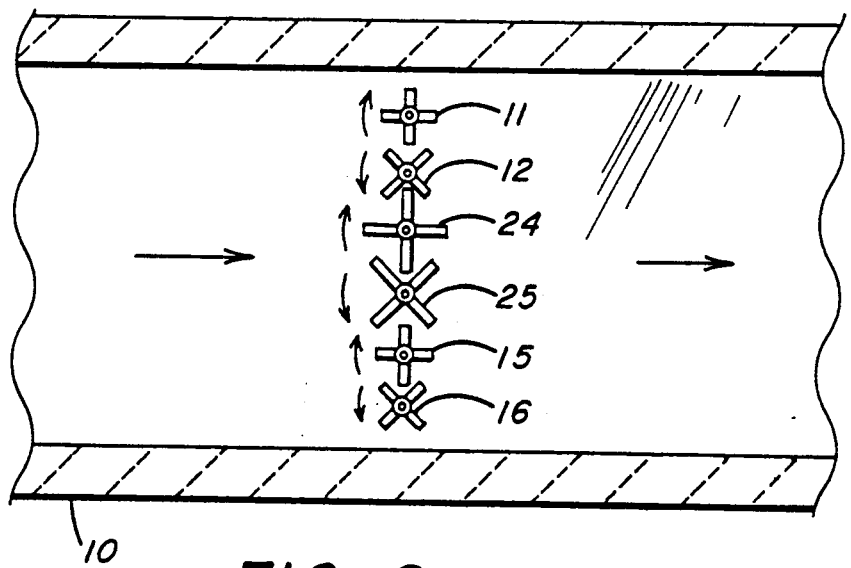
FIG. 2 is a schematic top view of a preferred embodiment of the present invention in which the center stirrers in a row are provided with enlarged diameters.

In FIG. 2 there is shown an arrangement in accordance with the present invention by which the banding effect downstream from the stirrers was shown to be eliminated in physical modelling studies. The FIG. 2 arrangement employs the same channel 10 and the same stirrer structure in the transverse row as the arrangement in FIG. 1 with the exception that the center two stirrers have been replaced with stirrers 24 and 25 having larger diameters. The rotational speed of all of the stirrers in the row remained the same. A relatively moderate increase of stirring force in the center area appears to be sufficient to achieve the desired result. Since the design of stirrers can vary considerably and the surrounding structural and process environment can also vary, it is difficult to precisely define a generalized minimum degree of increased stirring force required for the center region. Stirrers with diameters at least ten percent larger in the center may provide sufficiently enhanced stirring force in the center for some applications. In a particular example that yielded excellent results, the stirrers 24 and 25 had blades thirty percent longer than the blades of stirrers 11, 12, 15, and 16. A similar result could be expected if some, but not all, of the blades on a center stirrer are enlarged relative to the outboard stirrers. There is, in principle, no maximum differentiation in stirring power between the center and outboard regions, but in most situations an excessive stirring action may be undesirable if it causes entrainment of air or draws material from the bottom of the channel. It should be understood that enhanced stirring power can be achieved also by means other than stirrer diameter enlargement. Alternate means may include varying stirrer rotational speed (in embodiments without intermeshing stirrer blades), varying the pitch on the stirrer blades, or using entirely different stirrer designs at the center region and the outboard regions.

Figure 3:
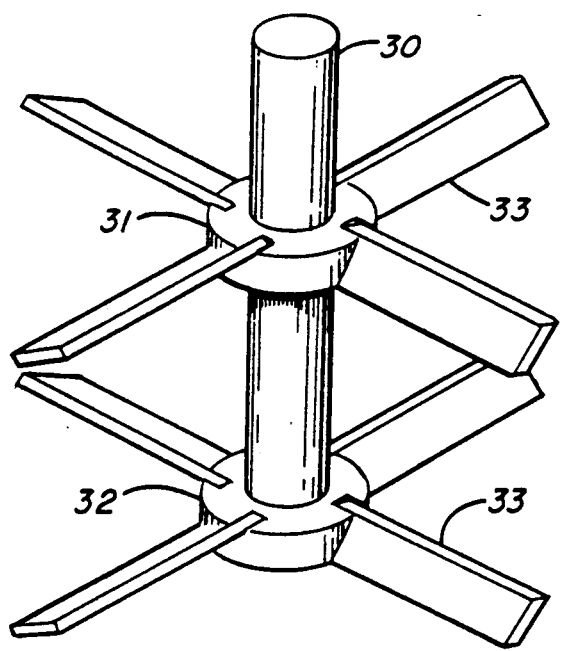
FIG. 3 is an isometric view of a preferred embodiment of a stirrer structure that may be employed with the present invention.

The principles of the present invention are not limited to a particular stirrer design, but for the purposes of illustrating the best mode of the invention, a specific example of a preferred stirrer design will be described in detail. The example is illustrated in FIG. 3, and is same type that is shown schematically in FIGS. 1 and 2. The single stirrer shown comprises a substantially vertical shaft 30 to which are attached a pair of spaced-apart hubs 31 and 32. Radially extending from each hub in substantially parallel, horizontal planes are a plurality of blades 33. Four blades 33 are shown extending from each hub in FIG. 3, but a smaller or larger number may be employed, subject to providing sufficient clearance for adjacent stirrer blades if the intermeshing mode is to be used. The blades 33 may be affixed in angled slots in the hubs 31 or 32 so as to set each blade at an angle from horizontal so as to produce a pumping action in the vertical direction. The angle may vary, but typically may be about forty-five degrees. Preferably, the rotation of the stirrer is in the direction that causes the angled blades to force material upwardly so as to avoid drawing air into the molten material. For example, rotation of the stirrer in FIG. 3 would preferably be in the clockwise direction. The speed of rotation, the diameter of the stirrer, the pitch of the blades, the viscosity of the material being stirred, and the amount of agitation considered desirable for a particular application are interrelated, and each of these factors can vary considerably within the scope of the present invention. In one particular example, outboard stirrers 11, 12, 15, and 16 had diameters of 10 inches (25.4 centimeters), the center stirrers 24 and 25 had diameters of 13 inches and (33 centimeters), the blade pitch was 45 degrees, and rotation was at 20 to 25 revolutions per minute.

The use of two hubs and two tiers of blades on each stirrer shaft has been found to provide good stirring action and is preferred for that reason, but is not an essential part of the present invention. More than two tiers may be useful in some situations. The use of plural tiers is advantageous for providing homogenization throughout the depth of the material being stirred. Therefore, a single tier may be suitable for a shallow depth, but if the channel has greater depth two or more tiers may be preferred. Although conditions may vary in different specific situations, in one particular example it was preferred to use at least one stirrer for approximately each five inches (12.7 centimeters) of molten glass depth. U.S. Pat. No. 4,493,557 (Nayak et al.) discloses a similar two-tiered stirrer, and additional details regarding the stirrer construction can be found there. That patent specifies that the blades in vertically adjacent tiers should be out of alignment with each other vertically, but aligning the blades vertically has been found to be sufficient and is preferred in the present invention. Stirrers of the preferred type, with blades in tiers, are also shown in U.S. Pat. Nos. 2,877,280 (Eden), and 3,236,618 (Allman). Stirring arrangements in which blades of adjacent stirrers intermesh with each other are shown in U.S. Pat. Nos. 1,988,783 (Canfield) and 3,053,517 (Penberthy). The stirrers shown in these patents are examples of alternative embodiments that may be used with the present invention. Another alternative is for the blades of adjacent stirrers to overlap on different vertical planes, i.e., without intermeshing in one plane.

The shaft 30, hubs 31 and 32, and the blades 33 of the stirrer of FIG. 3 may be fabricated from ceramic refractory, but preferably are fabricated from refractory metal such as molybdenum, tungsten, or platinum. Stainless steel coated with molybdenum or platinum may also be suitable in some cases. Another alternative stirrer construction may employ stainless steel with internal passageways for circulation of coolant such as water.

Reference has been made to specific examples for the sake of setting forth a specific preferred embodiment of the invention, but it should be understood that other variations and modifications known to those of skill in the art may be resorted to within the scope of the invention as defined by the claims that follow.

I claim:

1. A method for mixing molten glass or the like in which a stream of molten glass is passed along a channel, and the molten stream is stirred by means of a row of at least five stirrers extending substantially across the channel, characterized by carrying out the stirring in the center portion of the row with stirrers having diameters at least ten percent greater than stirrers in outboard portions of the row to provide substantially greater stirring force than the stirring force used in outboard portions of the row comprised of at least two stirrers on each side of the center portion, whereby a more thorough homogenization is achieved.

2. The method of claim 1 wherein at least one of the stirrers in the center portion of the row is at least thirty percent larger in diameter than any stirrer outboard of the center portion of the row.

3. The method of claim 1 wherein the stirring is carried out by a row of stirrers including at lest six stirrers in a row extending substantially across the channel.

4. Apparatus for mixing molten glass or the like comprising a channel adapted to convey a stream of molten glass in a generally longitudinal direction, and a row of at lest five stirrers spaced transversely across the channel so as to be immersed in the stream of molten glass, characterized by stirrers in a center portion of the row being at least ten percent greater in diameter relative to stirrers of an outboard portion of the row comprised of at least two stirrers on each side of the center portion.

5. The apparatus of claim 4 wherein the stirrers include blades extending from shafts, and at least some of the blades in the center portion are longer than blades outboard of the center portion.

6. The apparatus of claim 4 wherein the larger diameter in the center portion is at least thirty percent greater than the diameter of the largest stirrer outboard of the center portion.

7. The apparatus of claim 8 wherein the row of stirrers includes at least six stirrers substantially in a row.

8. The method of claim 3 wherein the center portion of the row is comprised of at least two stirrers.

9. The method of claim 8 wherein the number of stirrers in the center portion is two.

10. The apparatus of claim 7 wherein the center portion of the row is comprised of at least two stirrers.

11. The apparatus of claim 10 wherein the number of stirrers in the center portion is two.

* * * * *